United States Patent [19]
Matiacio et al.

[11] Patent Number: 5,716,540
[45] Date of Patent: Feb. 10, 1998

[54] APPARATUS AND METHOD FOR PRODUCING CENTER GATED LENS MOLDS FOR CONTACT LENS MANUFACTURE

[75] Inventors: Thomas A. Matiacio; Keith T. O'Brien; Victor Lust; Jeffrey H. Roffman; Kornelis Renkema, all of Jacksonville, Fla.; Wybren van der Meulen, Nuenen, Netherlands; Franciscus Paridaans, Ruesel, Netherlands; Jan van Lievenoogen, Heythuysen, Netherlands

[73] Assignee: Johnson & Johnson Vision Products, Inc., Jacksonville, Fla.

[21] Appl. No.: 598,883

[22] Filed: Feb. 9, 1996

[51] Int. Cl.⁶ ............................................. B29D 11/00
[52] U.S. Cl. .................... 249/117; 264/2.5; 264/225; 264/328.1; 425/568; 425/808
[58] Field of Search ................ 264/2.5, 225, 328.9, 264/328.15, 328.1; 425/808, 542, 568; 249/117, 127

[56] References Cited

U.S. PATENT DOCUMENTS

| | | | |
|---|---|---|---|
| 4,284,591 | 8/1981 | Neefe | 264/2.5 |
| 4,640,489 | 2/1987 | Larsen. | |
| 4,836,960 | 6/1989 | Spector et al. | 425/808 |
| 5,139,724 | 8/1992 | Hofstetter et al. | 425/549 |
| 5,456,864 | 10/1995 | Wickes et al. | 425/808 |
| 5,632,936 | 5/1997 | Su et al. | 264/DIG. 78 |

FOREIGN PATENT DOCUMENTS

| | | | |
|---|---|---|---|
| 60-122128 | 6/1985 | Japan | 425/808 |

*Primary Examiner*—Mathieu D. Vargot

[57] ABSTRACT

A method and apparatus for the manufacture of lens molds used in the formation of optical contact lenses, the apparatus including a center gate aligned on the central axis of the lens mold cavity for delivery of the melt polymer in an axisymmetrical manner. The methodology produces lens molds of extremely precise dimensions as measured against lens molds produced with side gated technology.

27 Claims, 3 Drawing Sheets

APPARATUS AND METHOD FOR PRODUCING CENTER GATED LENS MOLDS FOR CONTACT LENS MANUFACTURE

BACKGROUND OF THE INVENTION

This invention relates generally to improved high precision lens molds for use in the manufacture of very thin contact lenses and to the method and apparatus for making the improved lens mold. Lens molds are usually produced in matched pairs from thermoplastics and the combination of matched pairs forms the mold cavity to define the optical contact lens. More particularly, the invention relates to precision lens molds made by filling a mold cavity through a center gate on the central axis of the mold cavity rather than through a side gate on the edge of the mold cavity.

As is known in the art, optical contact lenses are typically manufactured by dosing a UV curable polymer into a concave front, or optical, curve lens mold and mating a convex back or base curve lens mold onto the front lens mold to create a filled mold cavity. The front lens mold and base lens mold are injection molded from a thermoplastic polymer, such as polystyrene. Standard practice is to form the front and back lens molds by injecting the liquid polymer into a closed mold through a side gate along the edge of the closed mold cavity, with a corresponding outlet gate positioned on the opposite side of the closed mold cavity. The liquid polymer enters the edge of the cavity and flows across the cavity to completely fill it. This side gate method for formation of a circular spherical part leads to a lack of precision from non-uniform, asymmetric flow and non-uniform plastic shrinkage in different directions with respect to radius, dimensional instability, surface radius irregularity, flatness, roundness and especially knife edge radius uniformity. The lack of knife edge uniformity subsequently leads to misalignment, known as decentration or tilt, when the base lens mold is joined to the front lens mold in the manufacture of the actual contact lens. Tilt adversely affects the lens center thickness and the resulting contact lens is not within acceptable tolerance values and must be rejected.

While this is a problem in current manufacture, the percentage loss of contact lenses can be maintained within acceptable levels since the tolerances are relatively large for lenses with thicknesses of 70 to 230 microns or more. However, it is desirable to improve manufacturing yield of typical contact lenses as well as to manufacture very thin contact lenses with thicknesses on the order of 50 microns to improve oxygen transmission, user comfort and optical properties. Such lenses require a lens center thickness tolerance in the range of only +/−5 microns. Such a precise thin lens cannot be consistently manufactured using lens molds produced from present side gate methodology, the irregularities resulting in the lens molds from asymmetrical polymer flow across the curved mold cavity being well outside the small tolerance ranges for various measurement parameters.

It is the universally held position by those knowledgeable in the art that gates should be located only in non-critical areas of plastic parts, and therefore center gating has not been considered possible for production of mold curves used to make precision optical lenses because of the inherent flow disturbances and sink mark aberrations occurring near the gate location, which in the case of the lens mold is an extremely critical area. Additionally, since the center gate must by necessity be on the non-critical side of the lens mold, the injection molding processing would be more difficult due to the reduced amount of polymer subjected to proper melt pressure. It has been found however that such problems can be overcome and that a lens mold within precise tolerances can be manufactured using center gate methodology. The use of center gating for delivering liquid polymer into a circular spherical mold cavity as herein described better ensures uniform filling of the cavity because of axisymmetric flow, which results in more uniform shrinkage and therefore improved physical properties of the resulting lens mold.

It is an object of this invention to provide a method and apparatus for the manufacture of precision lens molds suitable for use in the manufacture of contact lenses, the lens mold being manufactured by center gate processing methodology. It is a further object to provide such a method and apparatus for the manufacture of precision lens molds suitable for the manufacture of very thin contact lenses on the order of 50 microns in lens center thickness. It is a further object to provide a particularly defined mold core in combination with a particularly defined liquid polymer injection probe means to practice the method of the invention. It is a further object to provide such method and apparatus whereby both the front lens molds and back lens molds may be produced using center gated technology.

SUMMARY OF THE INVENTION

The invention is an apparatus and method of manufacturing lens molds for the production of optical contact lenses, the lens mold being center gated at the central axis, as well as the resulting lens molds formed by this process. The lens molds are manufactured of a thermoplastic material, which may be either crystalline or non-crystalline due to the axisymmetrical nature of the lens mold configuration. The lens mold has a circular perimeter formed by a flat annular flange which surrounds and extends from a spherical central portion having a convex side and a concave side. One side of each lens mold, the concave side for a front lens mold and the convex side for a back or base lens mold, is defined as the critical side and must pass extremely tight tolerance parameters. The lens molds are typically between approximately 0.8 to 1.0 mm thick, the molding cavity being formed by a mated core member and an insert member, the insert member forming the critical side of the part and being manufactured to extremely high tolerances of less than 1 micron. A center gate is located in the core member at the central axis of the mold cavity, the gate comprising a tubular conduit between approximately 0.8 to 1.2 mm in length and from approximately 0.5 to 1.2 mm in diameter, with a slight flaring of approximately 2 degrees, the diameter of the gate being slightly larger at the exit end adjacent the mold cavity than at the gate entrance. The edge at the juncture of the gate and the mold cavity is chamfered or radiused. The core member expands and enlarges backward in a conical, bell-shaped or flared manner beginning at the entrance of the gate to form a reserve area to receive any excess liquid polymer after the mold cavity has been filled and to provide space to receive the liquid polymer delivery means. The polymer delivery means is comprised of a polymer delivery probe or nozzle configured with a tapering nose, having a delivery conduit of between approximately 0.5 to 1.2 mm in diameter, and is positioned with its tip between approximately 0.5 to 1.3 mm from the entrance of the gate. The probe and insert member are composed of a material having high heat conductivity and the polymer dosing is performed using high precision injection molding equipment. The lens mold produced by the apparatus is extremely precise due to axisymmetrical flow and shrinkage, having measurable critical values with much smaller deviation than the deviation of similar values in lens molds produced with side gated technology.

DETAILED DESCRIPTION OF THE INVENTION

Figure 1:
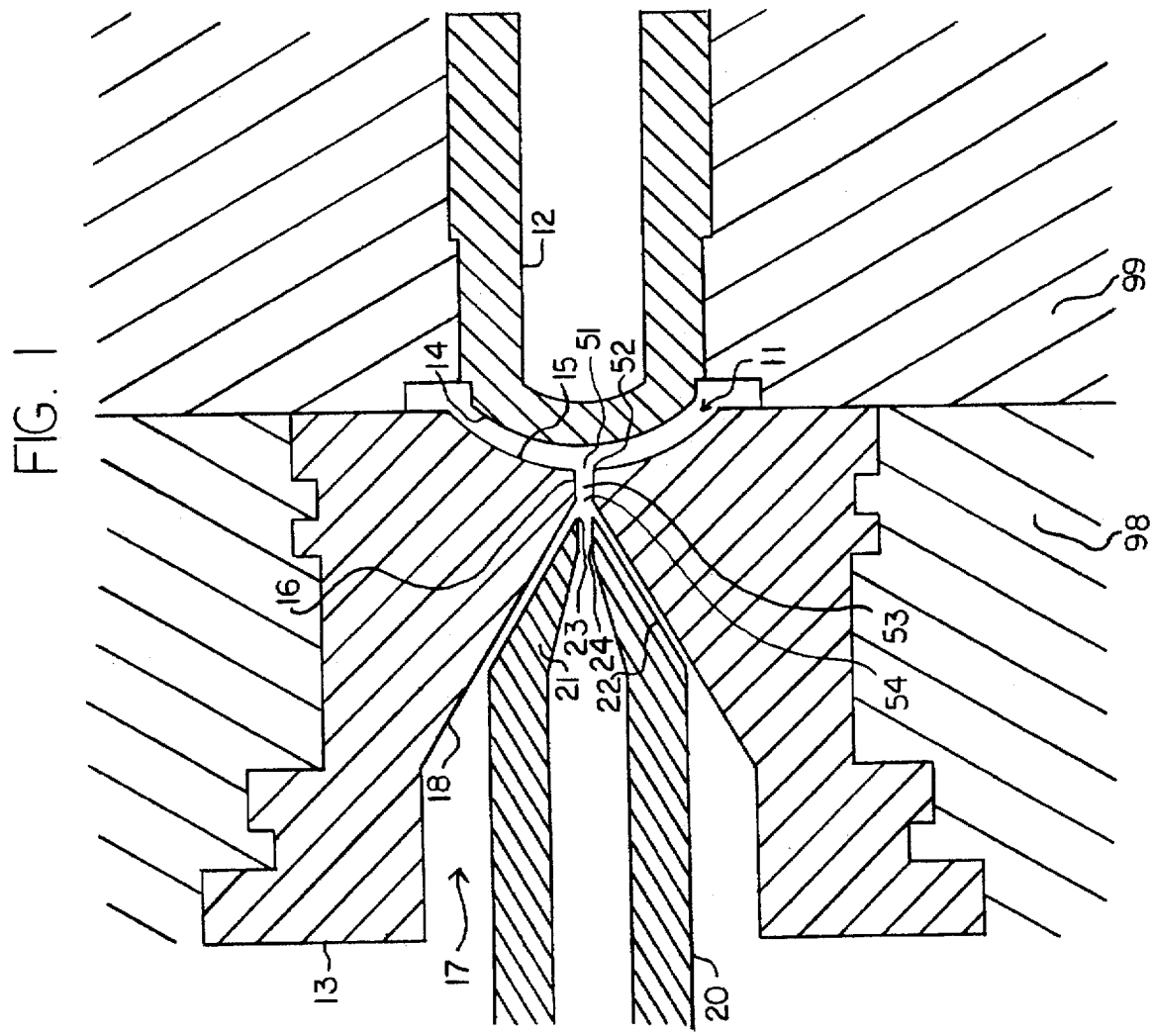
FIG. 1 is a cross-sectional detail view of the critical area of the injection molding apparatus for production of a front lens mold.
Figure 2:
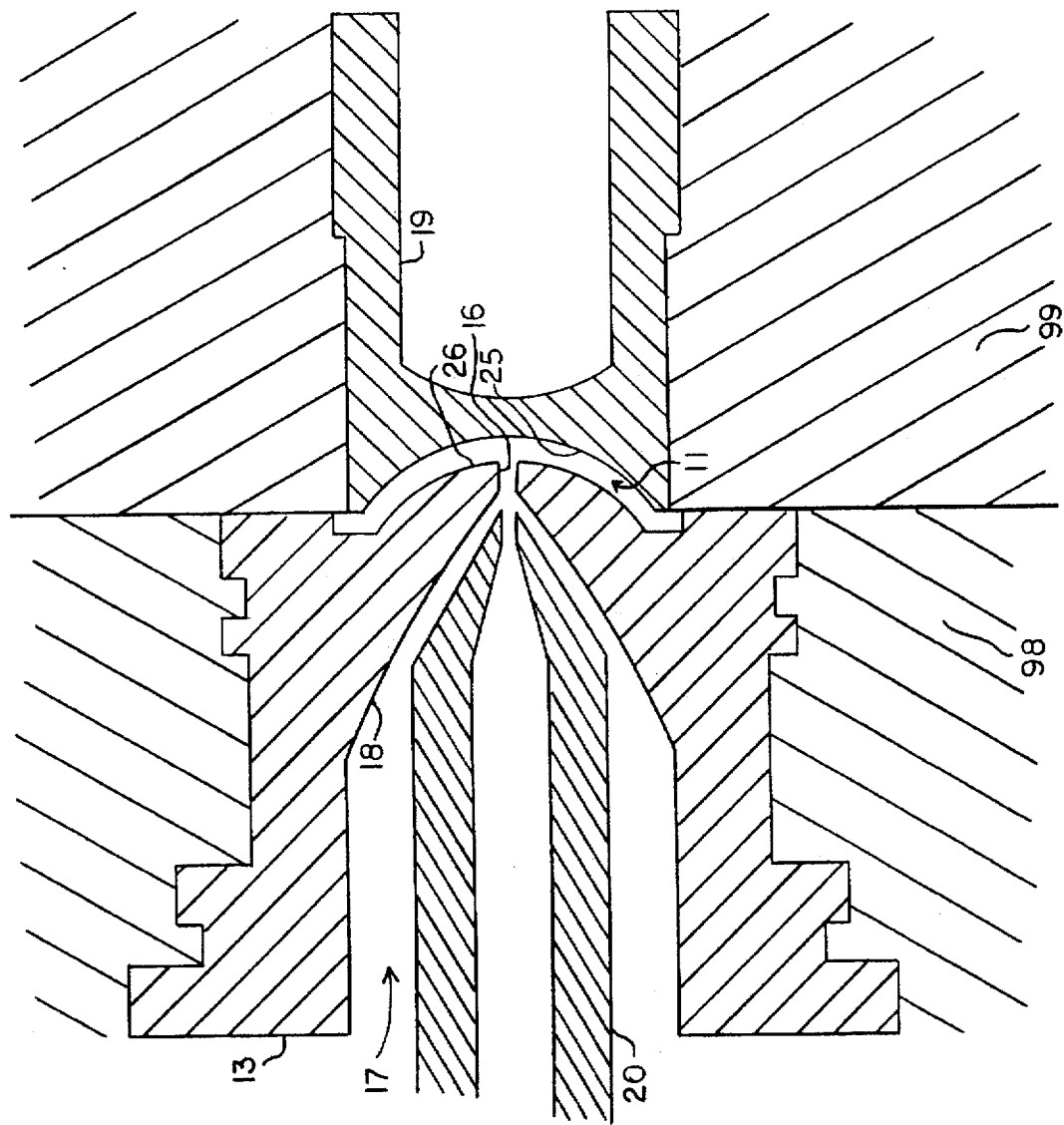
FIG. 2 is a cross-sectional detail view of the critical area of the injection molding apparatus for production of a back lens mold.

With reference now to the drawings, the invention will be described in detail with regard to the best mode and preferred embodiment. FIGS. 1 and 2 are details illustrating the critical portion of a melt delivery apparatus in the vicinity of the mold cavity, the melt delivery apparatus being a precision injection molding apparatus for delivering molten polymer into a mold cavity under heat and pressure for formation of a plastic part, in this case a lens mold for subsequent use in the manufacture of a contact lens.

Figure 3:
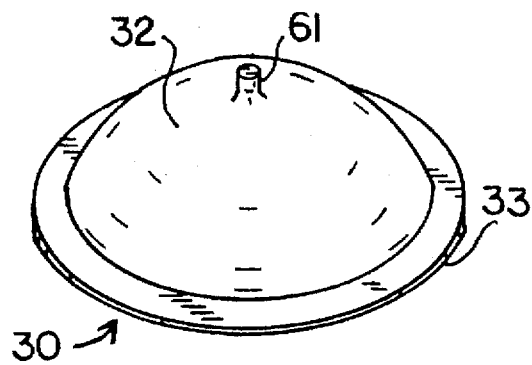
FIG. 3 is a perspective view of a front lens mold.

FIG. 1 illustrates the apparatus for production of a front lens mold 30, shown in FIG. 3, under the methodology of the invention. The front lens mold 30 is configured as a partially spherical object with a concave side 31 and a convex side 32, defined in general as a portion of a sphere sliced by an imaginary plane to provide a generally circular perimeter. An annular, generally planar flange 33 surrounds and extends from the partial spherical portion around the circular perimeter. A mold cavity 11 is created by mating a front curve insert 12 and a core member 13 within separable mold block halves 98 and 99. The mold cavity 11 is configured as a portion of a sphere having a convex side 14 and a concave side 15, with a peripheral portion to form the annular flange 33 of the front lens mold 30 centered on the central axis. The front curve insert 12 is a precisely machined member fixed within the mold block back half 99 of the injection molding apparatus, the convex surface 14 of the front curve insert 12 forming the curved mold wall for the critical concave side 31 of the front lens mold 30 to be produced. The front curve insert 12 may be of the standard multi-part stacked assembly requiring one or more shims or bushings for proper alignment, but is preferably constructed as a unitary member precisely machined to provide correct alignment and positioning relative to the core member 13.

The core member 13 is a member fixedly inserted within the mold block front half 98 of the injection molding apparatus. The forward concave surface 15 of the core member 13 forms the curved mold wall for the non-critical side 32 of the mold cavity 11. Coaxially positioned on the central axis of the spherical concave surface 15 is center gate 16, generally circular in cross-section, which comprises a gate exit 51 having a radiused or chamfered edge 52 along the juncture between the gate 16 and the concave surface 15 of the mold cavity 15, a slightly tapered channel 53 and a gate entrance 54 for receiving the liquid polymer, the channel 53 increasing in diameter at the rate of approximately 2 degrees from the gate entrance 54 to the gate exit 5 . Preceding the entrance 54 of the center gate 16 is a polymer receiving reservoir 17 formed by a conical wall 18 which adjoins the entrance 54. Conical wall 18 is preferably formed at an angle of approximately 45 degrees to the central axis. The polymer receiving reservoir 17 is constructed to receive excess liquid polymer when the center gate 16 and the mold cavity 11 are completely filled during the injection step, and also provides the access means for positioning of the polymer injection probe or nozzle 20 which delivers the liquid polymer under heat and pressure to the center gate 16 and the mold cavity 11. The injection probe 20 has a tapered nose 21 having a conical wall 22 and ending in a probe tip 23 containing a cylindrical delivery conduit 24. The probe wall 22 and the polymer reservoir wall 18 are substantially parallel or increasingly separated in the direction away from the center gate 16 in order to create a nonrestricting flow channel for the excess polymer. Preferably, for a polymer reservoir wall 18 at 45 degrees to the central axis, the probe wall 22 is configured at a 30 degree angle off the central axis. The probe 20 is connected to the general liquid polymer delivery means of the injection molding apparatus. The probe 20 and front curve insert 12 are composed of high strength, high heat conductivity materials, such as nickel coated brass or stainless steel.

The dimensions of the various components are critical, as is the relationship between the dimensions of the components for a given choice of variables related to the choice of polymer material, polymer processing and flow characteristics, and lens mold size and thickness, to insure production of precision lens molds meeting desired tolerances. For the formation of a front lens mold approximately 1.0 mm in thickness, the internal diameter of the center gate 16 should be between approximately 0.6 to 1.2 mm, with a preferred diameter of approximately 0.75 mm, and the axial length of the channel 53 should be between approximately 0.8 to 1.2 mm, with a preferred length of approximately 1.0 mm. Increasing the center gate 16 diameter to greater than 1.2 mm results in unacceptable enlargement of the sink mark depression on the critical side 31 of the front lens mold 30. Decreasing the diameter of the center gate 16 reduces the sink mark depression, but the diameter must be kept greater than approximately 0.6 mm to insure sufficient flow volume to completely fill the mold cavity 15. The internal diameter of the delivery conduit 24 of the probe 20 should be generally equal to or greater than the diameter of the entrance 54 of the center gate 16. For a center gate 16 diameter of 0.75 mm, the internal diameter of the delivery conduit 24 is preferably 1.0 mm. The distance between the probe tip 23 and the entrance 54 of the center gate 16 is very critical to insure proper flow into the mold cavity 16, the precise distance being dictated by the dimensions of the center gate and the polymer flow characteristics. The distance from probe tip 23 to center gate entrance 54 is between approximately 0.8 to 1.3 mm, and is preferably approximately 1.06 mm in the heated state for the front lens mold.

Figure 4:
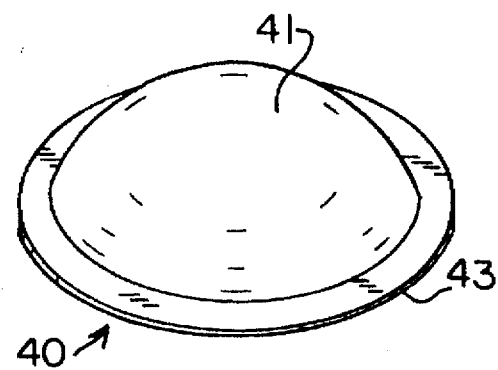
FIG. 4 is a perspective view of a base lens mold.

For production of the base lens mold 40 as shown in FIG. 4, the overall apparatus is very similar to that described above, with the required change in the configuration of the mold cavity 15 as shown in FIG. 2, such that the polymer flow direction is reversed within the mold cavity 15 instead of being a continually forward flow as in the mold cavity 15 for the front lens mold 30. Like the front lens mold 30, the back lens mold 40 has a convex side 41, a concave side 42 and an annular flange 43. Here the back curve insert 19 member has a concave surface 25 which becomes the mold wall for the critical convex side 41 of the base curve mold 40. The core member 13 is now configured such that the cavity end has a convex surface 26 to form the non-critical concave side 42 of the base lens mold 40. The mold cavity 15 for a base lens mold 40 is typically approximately 0.8 mm in thickness. The dimensions and spatial relationship for the center gate 16 and probe 20 are adjusted due to the reverse flow required to fill the mold cavity 15 of the base lens mold 40. The center gate 16 diameter is smaller, being between approximately 0.5 to 1.0 mm, and preferably approximately 0.6 mm. Preferably, the internal wall 18 of the polymer receiving reservoir 17 is radiused rather than planar, and the conical wall 22 of the injection probe 20 is narrower, angled at approximately 22.5 degrees off the central axis. The delivery conduit 24 is also smaller, being sized at approximately 0.8 mm for a 0.6 mm center gate 16. The distance between the probe tip 23 and the center gate entrance 54 is between approximately 0.5 to 1.0 mm, and preferably approximately 0.72 mm in the heated state.

To fabricate the center gated lens molds 30 or 40, the injection molding apparatus is assembled with the components set forth above. Processing parameters are determined by the particular characteristics of the polymer being utilized. For polystyrene, a polymer commonly used in the formation of lens molds, the probe 20 is heated to approximately 570 degrees F and the core member 13 and curve insert 12 or 19 is heated to approximately 150 degrees F. For injection and fill of the liquid polymer, peak pressure is preferably approximately 18,000 psi and hold pressure is maintained at approximately 6,000 psi. Cure time is between approximately 6 and 10 seconds. Because of the axisymmetrical flow from the center gate 16 into the mold cavity 11, it is now possible to use crystalline polymers, such as polypropylene, for production of the lens molds. Polypropylene is not suitable for use with side gated technology because its highly directional shrinkage results in unacceptable variations in the finished product. For polypropylene, the temperatures are slightly lower—the probe 20 being maintained at approximately 420 degrees F and the core member 13 and curve insert 12 or 19 being maintained at approximately 130 degrees F. The polymer is dosed in a predetermined volume to insure complete fill of the mold cavity 15, with excess polymer flowing into the receiving recess 17.

Figure 5:
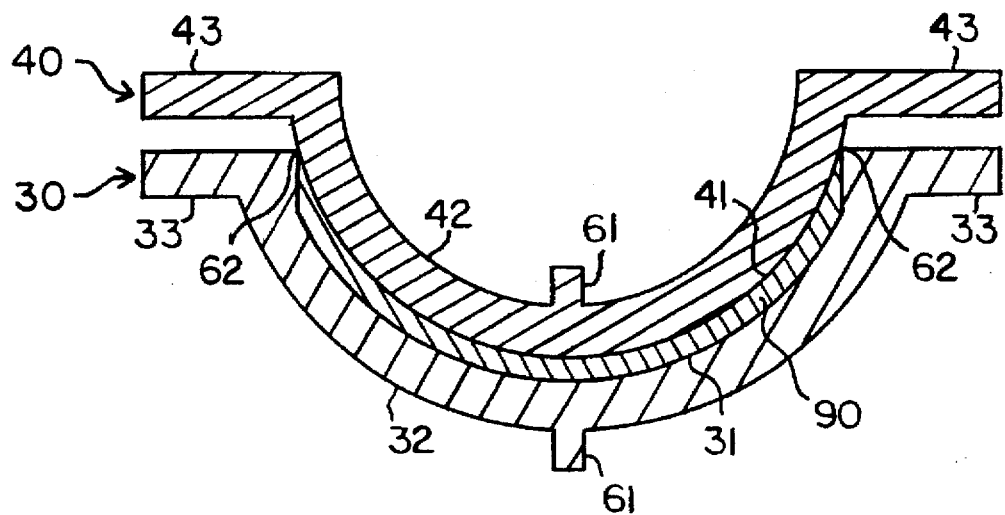
FIG. 5 is a cross-sectional view of a contact lens as formed within the mold cavity created by combining a front lens mold and a base lens mold produced according to the invention.

The resulting front lens mold 30 and base lens mold 40 produced by this methodology are shown in FIGS. 3, 4 and 5. The lens molds 30 and 40 separate from the waste material adjacent the entrance 54 of the center gate 16, such that a sprue 61 of cured polymer extends from the non-critical sides 32 and 42 of each of the front lens mold 30 and base lens mold 40. Because the molding of the contact lens 90 occurs between the critical sides 31 and 41, the sprues 61 do not interfere. Since production of contact lenses with center of lens thicknesses in the range of 50 microns requires tolerances at most of +/-5 microns, there are a number of critical areas on the lens molds 30 and 40 which must be maintained within precise parameters. Of particular importance are the surface and edge characteristics of the critical sides 31 and 41. Application of the methodology set forth above produces lens molds 30 and 40 with thickness variations less than 1 micron in magnitude at the centrally located sink mark site, and the use of the center gate 16 produces uniform axisymmetrical fill in all radial directions, resulting in an improved knife edge 62 at the junction between the front lens mold 30 and the base lens mold 40. Variation in knife edge measurements for side gated front lens molds typically range up to 25 microns, whereas variations in knife edge measurements for center gated front lens molds are less than 2 microns. Mean peak to valley measurements, performed on a Zygo interferometer, can typically range up to 3 wave for side gated lens molds, while mean peak to valley values for center gated lens molds are less than 1 wave. The center Bated methodology produces front lens molds having variation in sagittal depth of only plus or minus 3 microns.

To manufacture a contact lens 90 with a center of lens thickness on the order of 50 microns, a front lens mold 30 and a base lens mold 40 are produced according to the process set out above. Preferably, the apparatus is constructed such that multiple lens molds are produced simultaneously. The front lens mold 30 is then placed in a holding fixture and dosed with a UV-polymerizable polymer of a type well-known in the art. The base lens mold 40 is then combined with the front lens mold 30 as shown in FIG. 5 to create the mold cavity of correct shape. Pressure is applied to the base lens mold 40 to properly seat and maintain it in correct alignment with front lens mold 30, and the liquid polymer is exposed to UV energy to cure the polymer. After curing, the mold cavity is opened and the cured polymer contact lens 90 is removed for subsequent processing.

It is contemplated that substitutions and equivalents for components or steps set forth above may be apparent to those skilled in the art, and therefore the true scope and definition of the invention is to be as set forth in the following claims.

We claim:

1. An injection molding apparatus for the manufacture of lens molds used for the formation of optical contact lenses, said apparatus comprising:

(A) a curve insert member and a core member adapted to form in combination a mold cavity having a central axis, said mold cavity configured as a partial sphere with a generally planar annular flange extending from said partial sphere, said core member comprising a center gate aligned on said central axis and connecting to said mold cavity, and (B) means to inject liquid polymer through said center gate along said central axis and into said mold cavity.

2. The apparatus of claim 1, where said means to inject liquid polymer comprises a polymer injection probe comprised of a tapered nose, a conical wall, a delivery conduit and a probe tip.

3. The apparatus of claim 1, where said center gate comprises a tapered channel.

4. The apparatus of claim 1, where said center gate comprises a gate exit having a chamfered edge.

5. The apparatus of claim 2, where said center gate comprises a gate entrance and said probe tip is separated a distance from said gate entrance.

6. The apparatus of claim 5, where said probe tip is positioned approximately 0.5 to 1.3 millimeters from said gate entrance.

7. The apparatus of claim 6, where said center gate has a diameter of approximately 0.5 to 1.2 millimeters.

8. The apparatus of claim 7, where said center gate has an axial length of approximately 0.8 to 1.2 millimeters.

9. An apparatus for use in an injection molding device for the manufacture of lens molds used for the formation of optical contact lenses, said apparatus comprising:

(A) a curve insert member and a core member adapted to form in combination a mold cavity having a central axis, said mold cavity configured as a partial sphere with a generally planar annular flange extending from said partial sphere, said core member comprising a center gate aligned on said central axis, and (B) means to inject liquid polymer through said center gate along said central axis and into said mold cavity.

10. The apparatus of claim 9, where means to inject liquid polymer comprises a polymer injection probe comprised of a tapered nose, a conical wall, a delivery conduit and a probe tip.

11. The apparatus of claim 9, where said center gate comprises a tapered channel.

12. The apparatus of claim 9, where said center gate comprises a gate exit having a radiused edge.

13. The apparatus of claim 10, where said center gate comprises a gate entrance and said probe tip is separated a distance from said gate entrance.

14. The apparatus of claim 13, where said probe tip is positioned approximately 0.5 to 1.3 millimeters from said gate entrance.

15. The apparatus of claim 14, where said center gate has a diameter of between 0.5 to 1.2 millimeters.

16. The apparatus of claim 15, where said center gate has an axial length of approximately 0.8 to 1.2 millimeters.

17. A method of manufacturing a lens mold for producing optical contact lenses, the method comprising the steps of providing an injection molding apparatus capable of delivering liquid polymer into a mold cavity having a central axis, said mold cavity configured as a partial sphere with a generally planar annular flange extending from said partial sphere, providing a curve insert member and a core member within said injection molding apparatus which in combination form said mold cavity, said core member having a center gate aligned on said central axis, delivering liquid polymer into said mold cavity through said center gate, curing said liquid polymer in said mold cavity to form a lens mold, and removing said lens mold.

18. The method of claim 17, further comprising the step of providing polymer injection probe and positioning said polymer injection probe so as to be separated from said center gate.

19. The method of claim 18, further comprising the step of providing said center gate with a gate entrance, a channel and a gate exit, where said center gate is approximately 1.0 millimeters in length and between approximately 0.7 to 1.0 millimeters in diameter.

20. The method of claim 19, where said polymer injection probe is positioned approximately 0.7 millimeters from said gate entrance.

21. The method of claim 17, where said step of delivering liquid polymer comprises delivering a crystalline polymer.

22. The method of claim 21, where said crystalline polymer is polypropylene.

23. A lens mold for use in manufacturing optical contact lenses, said lens mold comprising a flat annular flange extending from a spherical central portion, a critical side, a noncritical side a cured polymer sprue extending from the spherical central portion on the noncritical side, and a centrally located sink mark site on the critical side opposite the sprue, said lens mold having a thickness variation of less than 1 micron at the sink mark site, said lens mold produced by the process comprising the steps of providing an injection molding apparatus capable of delivering liquid polymer into a mold cavity having a central axis, said mold cavity configured as a partial sphere with a generally planar annular flange extending from said partial sphere, providing a curve insert member and a core member within said injection molding apparatus which in combination form said mold cavity, said core member having a center gate aligned on said central axis, delivering liquid polymer into said mold cavity through said center gate, curing said liquid polymer in said mold cavity to form a lens mold, and removing said lens mold.

24. The lens mold of claim 23, where said lens mold is composed of a crystalline polymer.

25. The lens mold of claim 24, where said crystalline polymer is polypropylene.

26. The lens mold of claim 23, said lens mold having mean peak to valley values as measured on a Zygo interferometer of less than 1 wave.

27. The lens mold of claim 23, said lens mold having a variation in sagittal depth of only plus or minus 3 microns.

* * * * *